United States Patent
Fukushima et al.

(10) Patent No.: US 8,847,908 B2
(45) Date of Patent: Sep. 30, 2014

(54) DISPLAY DEVICE

(75) Inventors: Hiroshi Fukushima, Osaka (JP); Tomoo Takatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 116 days.

(21) Appl. No.: 13/641,004

(22) PCT Filed: Jan. 17, 2011

(86) PCT No.: PCT/JP2011/000192
§ 371 (c)(1),
(2), (4) Date: Oct. 12, 2012

(87) PCT Pub. No.: WO2011/132346
PCT Pub. Date: Oct. 27, 2011

(65) Prior Publication Data
US 2013/0033452 A1    Feb. 7, 2013

(30) Foreign Application Priority Data

Apr. 22, 2010    (JP) ................ 2010-098494

(51) Int. Cl.
*G09G 5/00*    (2006.01)
*G06F 3/044*    (2006.01)
*G06F 3/041*    (2006.01)
*G02F 1/1333*    (2006.01)

(52) U.S. Cl.
CPC ............ *G02F 1/13338* (2013.01); *G06F 3/044* (2013.01); *G06F 3/0412* (2013.01); *G06F 2203/04107* (2013.01); *G06F 2202/22* (2013.01); *G02F 2202/28* (2013.01)
USPC ........................................... 345/173; 349/12

(58) Field of Classification Search
CPC ....... G06F 3/041; G06F 3/0412; G06F 3/044; G06F 1/1643; G06F 2203/04103; G09G 3/36; G09G 2203/04107; G09G 2202/22; G09G 2202/28; G02F 1/13338
USPC ............................... 345/87, 173, 174; 349/12
See application file for complete search history.

(56) References Cited

U.S. PATENT DOCUMENTS

| | | | |
|---|---|---|---|
| 6,181,071 B1 * | 1/2001 | Yuuki et al. ............... | 315/169.3 |
| 2006/0142412 A1 * | 6/2006 | Yamaoka et al. ........... | 523/111 |
| 2006/0262258 A1 * | 11/2006 | Wang et al. ................ | 349/117 |
| 2008/0068342 A1 * | 3/2008 | Chang et al. ............... | 345/173 |

(Continued)

FOREIGN PATENT DOCUMENTS

| | | |
|---|---|---|
| JP | 2003-099193 A | 4/2003 |
| JP | 2008-153596 A | 7/2008 |

(Continued)

*Primary Examiner* — Tom Sheng
(74) *Attorney, Agent, or Firm* — Chen Yoshimura LLP

(57) ABSTRACT

Disclosed is a display device (50*a*) that includes a display panel (30) for displaying an image, a touch panel (40) of electrostatic capacitance coupling type that is disposed so as to face the display panel (30), and an adhesive layer (45) that is disposed between the display panel (30) and the touch panel (40) and that bonds the display panel (30) and the touch panel (40) to each other. The adhesive layer (45) is provided with a shield pattern (46*a*) that is configured to prevent electrical noise generated in the display panel (30) from affecting the touch panel (40). According to this configuration, it becomes possible to prevent the increase in the device thickness, and to prevent a decrease in the position detection accuracy of the touch panel.

6 Claims, 5 Drawing Sheets

(56) References Cited

U.S. PATENT DOCUMENTS

| | | |
|---|---|---|
| 2008/0211394 A1 | 9/2008 | Koshihara et al. |
| 2009/0321240 A1* | 12/2009 | Huang et al. .................. 200/512 |
| 2010/0001973 A1* | 1/2010 | Hotelling et al. ............. 345/174 |
| 2010/0040842 A1* | 2/2010 | Everaerts et al. ............. 428/201 |
| 2010/0087228 A1* | 4/2010 | Griffin et al. ................. 455/566 |
| 2010/0144391 A1* | 6/2010 | Chang et al. .................. 455/566 |
| 2010/0194699 A1* | 8/2010 | Chang ........................... 345/173 |
| 2010/0263917 A1* | 10/2010 | Heo et al. ...................... 174/254 |
| 2010/0265207 A1* | 10/2010 | Chen .............................. 345/174 |
| 2011/0099805 A1* | 5/2011 | Lee ................................. 29/846 |
| 2011/0109583 A1* | 5/2011 | Lee ................................ 345/174 |
| 2011/0115738 A1* | 5/2011 | Suzuki et al. ................. 345/173 |

FOREIGN PATENT DOCUMENTS

| | | |
|---|---|---|
| JP | 2008-218142 A | 9/2008 |
| JP | 2009-038078 A | 2/2009 |
| JP | 2009-86184 A | 4/2009 |
| JP | 2009-198588 A | 9/2009 |

\* cited by examiner (a) 46a

F
L (b) 46b

F
L (a)

(b)

(a)

(b)

DISPLAY DEVICE

TECHNICAL FIELD

The present invention relates to a display device, and more particularly, to a display device provided with a touch panel of electrostatic capacitance coupling type.

BACKGROUND ART

A touch panel of electrostatic capacitance coupling type has a rectangular-shaped transparent electrode, for example, and when a surface of the touch panel is touched, the transparent electrode is grounded through a human body at a touch position. This brings about a change in an electrostatic capacitance formed between four corners of the transparent electrode and the touch position, and based on this change, the touch position is detected. The touch panel of electrostatic capacitance coupling type has been widely used recently because this touch panel can be mounted on the front surface of a display panel such as a liquid crystal display panel at low cost.

In a liquid crystal display device having a touch panel of electrostatic capacitance coupling type mounted on the front surface of the liquid crystal display panel, electrical noise may reduce accuracy of detecting a touch position. Electrical noise is caused by, for example, an opposite potential that is supplied to a common electrode, which is disposed on an opposite substrate for the liquid crystal display panel, when displaying an image. To solve this problem, in a liquid crystal display device having a touch panel of electrostatic capacitance coupling type mounted thereon, a technique of providing a shielding member that reduces electrical noise between the touch panel and the liquid crystal display panel has been proposed.

Patent Document 1, for example, discloses a liquid crystal display device equipped with an electrostatic capacitance type touch panel disposed on the viewer side of the liquid crystal display device. This liquid crystal display device is provided with a shield layer interposed between the liquid crystal display device and the touch panel. The shield layer is constituted of a transparent conductive film that electrically isolates the touch panel from the liquid crystal display device, and a frame-shaped electrode having a low electrical resistance and formed on the entire circumference of the transparent conductive film in a frame shape. The shield layer blocks electrical noise generated by the liquid crystal display device.

Patent Document 2 discloses a transparent electromagnetic wave shielding film for a touch panel of a liquid crystal display device. The shielding film is disposed on a support member, and has a fine line pattern that is made of conductive metal containing developed silver.

RELATED ART DOCUMENTS

Patent Documents

Patent Document 1: Japanese Patent Application Laid-Open Publication No. 2009-86184
Patent Document 2: Japanese Patent Application Laid-Open Publication No. 2008-153596

SUMMARY OF THE INVENTION

Problems to be Solved by the Invention

There has been a strong demand for making a liquid crystal display device thinner for a mobile device such as a mobile phone and a mobile game console. This reduces the distance between the transparent electrode of the touch panel and the common electrode of the liquid crystal display panel described above. Therefore, in a liquid crystal display device for a mobile device having a touch panel of electrostatic capacitance coupling type mounted thereon, an effect of electrical noise caused by image display becomes more pronounced, and because the detection accuracy for a touch position is therefore lowered, an erroneous operation may occur. However, if a shield member, which was formed on another base member, is placed between the touch panel and the liquid crystal display panel as described above, the thickness of the device is increased. Therefore, this configuration needs to be improved.

The present invention was made in view of such problems, and aims at preventing an increase in the thickness of a display device provided with a display panel and a touch panel, and preventing a decrease in the position detection accuracy of the touch panel.

Means for Solving the Problems

In order to achieve the above object, in the present invention, a shield pattern is provided in an adhesive layer that bonds a display panel and a touch panel.

Specifically, a display device according to the present invention is provided with: a display panel that displays an image; a touch panel of electrostatic capacitance coupling type disposed so as to face the display panel; and an adhesive layer disposed between the display panel and the touch panel to bond the display panel and the touch panel to each other, wherein the adhesive layer has a shield pattern that is configured to prevent electrical noise generated in the display panel from affecting the touch panel.

According to this configuration, the shield pattern is provided in the adhesive layer that bonds the display panel for displaying an image and the touch panel of electrostatic capacitance coupling type to each other. Therefore, the adhesive layer, which is necessary for bonding the display panel and the touch panel to each other, also functions as a shield member for reducing electrical noise. This prevents a decrease in the position detection accuracy of the touch panel, which is caused by the electrical noise generated in the display panel, while preventing an increase in the thickness of the device. Therefore, in the display device provided with the display panel and the touch panel, it becomes possible to prevent a decrease in the position detection accuracy of the touch panel without increasing the device thickness.

The shield pattern may have a frame-shaped pattern portion disposed along a circumference of the adhesive layer in a frame shape, and a fine pattern portion disposed inside of the frame-shaped pattern portion in a grid pattern.

According to this configuration, the shield pattern is provided with the frame-shaped pattern portion that is disposed in a frame shape and the fine pattern portion that is disposed inside of the frame-shaped pattern portion in a grid pattern. Therefore, even if a display screen of the display device is made larger, the potential at the touch panel (i.e., the potential of a transparent electrode disposed on the touch panel) becomes more likely to be kept uniform throughout the entire screen. Consequently, it becomes possible to increase the screen size of the display device having a touch panel function.

The fine pattern portion may be formed to have a line width of 12 μm or less.

According to this configuration, the line width of the fine pattern portion that is disposed inside of the frame-shaped pattern portion in a grid pattern is 12 μm or less. Therefore, the fine pattern portion becomes less visible.

The shield pattern may be formed of a metal wire.

According to this configuration, because the shield pattern is formed of the metal wire such as copper or silver, for example, this shield pattern has a (significantly) lower electrical resistance as compared with a transparent conductive film such as an ITO (Indium Tin Oxide) film, which has been conventionally used as a shield member. Therefore, the electrical noise can be reduced by the shield pattern uniformly throughout the entire screen.

A surface of the shield pattern on a side facing the touch panel may be colored black.

According to this configuration, because the surface of the shield pattern on a side facing the touch panel is colored black, a reflection of ambient light entering from a touch panel side is suppressed. Consequently, a display quality is improved.

The shield pattern may be disposed inside of the adhesive layer.

According to this configuration, because the shield pattern is disposed inside of the adhesive layer, the entire front and rear surfaces of the adhesive layer retain adhesiveness. Therefore, the display panel and the touch panel are firmly bonded to each other.

The shield pattern may be disposed in a surface of the adhesive layer.

According to this configuration, the shield pattern is disposed in the surface of the adhesive layer. This allows the adhesive layer having the shield pattern to be formed by embedding the shield pattern in the surface of the adhesive layer or by forming a shield pattern on a surface of the display panel or the touch panel and by thereafter applying an adhesive agent thereon, for example. As a result, a manufacturing cost is reduced.

Effects of the Invention

According to the present invention, a shield pattern is provided in an adhesive layer that bonds a display panel and a touch panel. Therefore, in a display device provided with the display panel and the touch panel, it becomes possible to prevent a decrease in the position detection accuracy of the touch panel without increasing the device thickness.

DETAILED DESCRIPTION OF EMBODIMENTS

Embodiments of the present invention will be described below in detail with reference to figures. The present invention is not limited to the respective embodiments below.

Embodiment 1

Figure 1:
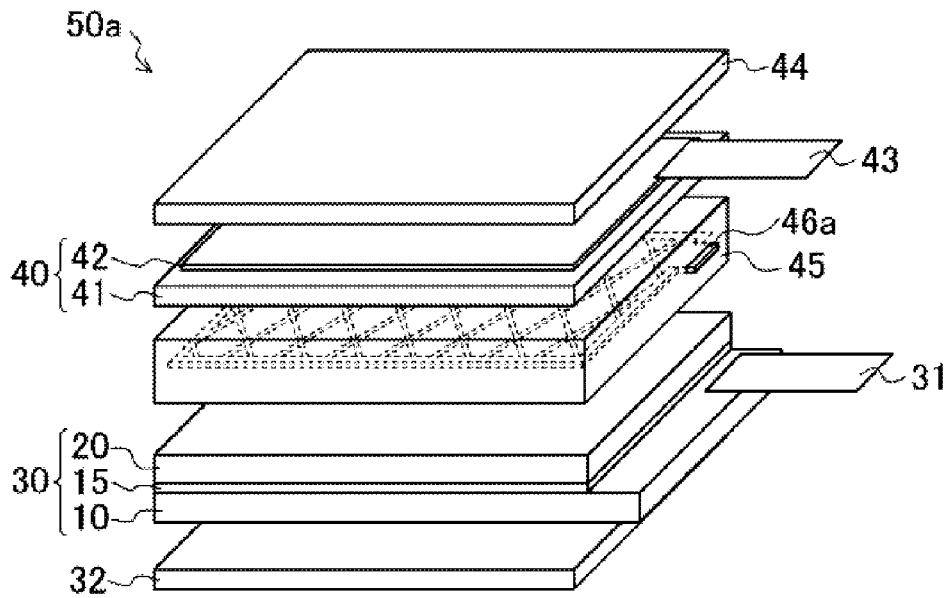
FIG. 1 is an exploded perspective view of a liquid crystal display device according to Embodiment 1.
Figure 2:
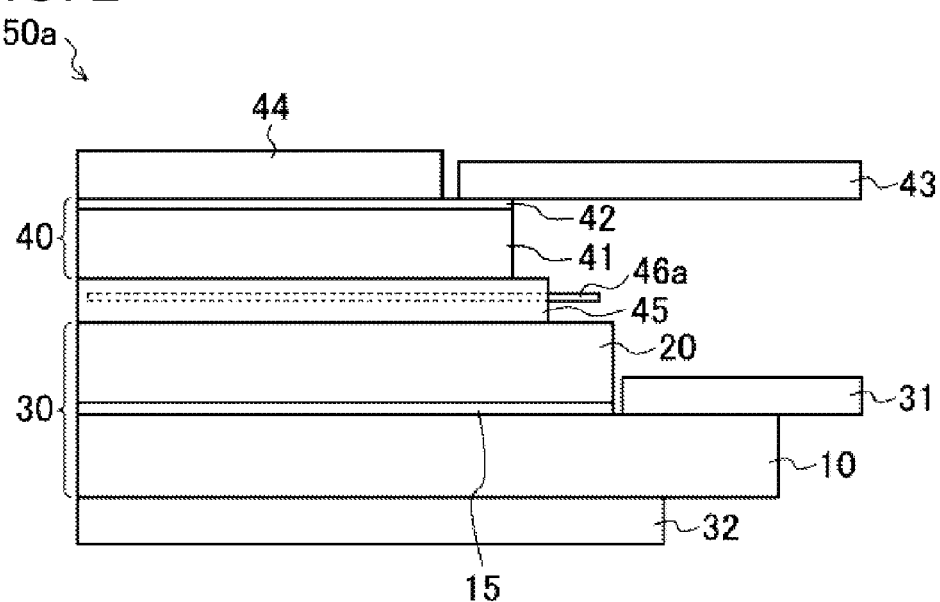
FIG. 2 is a side view of the liquid crystal display device according to Embodiment 1.
Figure 3:
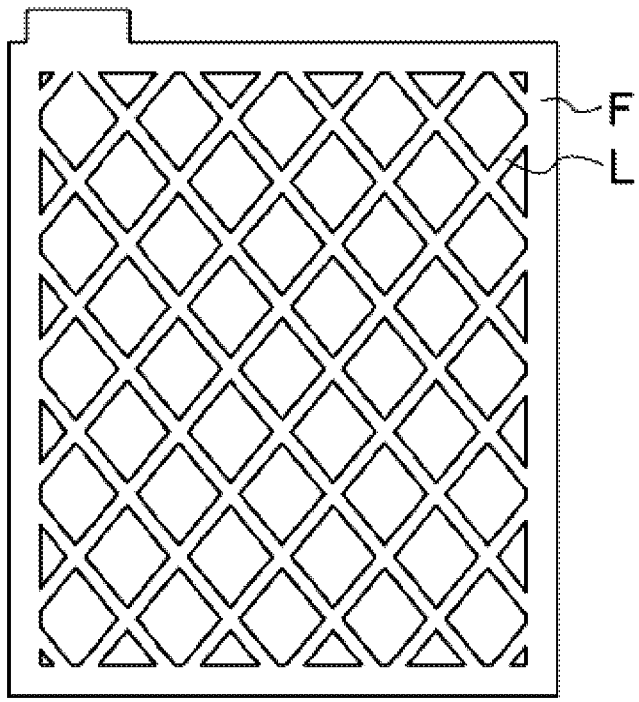
FIG. 3 is a plan view of a shield pattern for the liquid crystal display device according to Embodiment 1.
Figure 3:
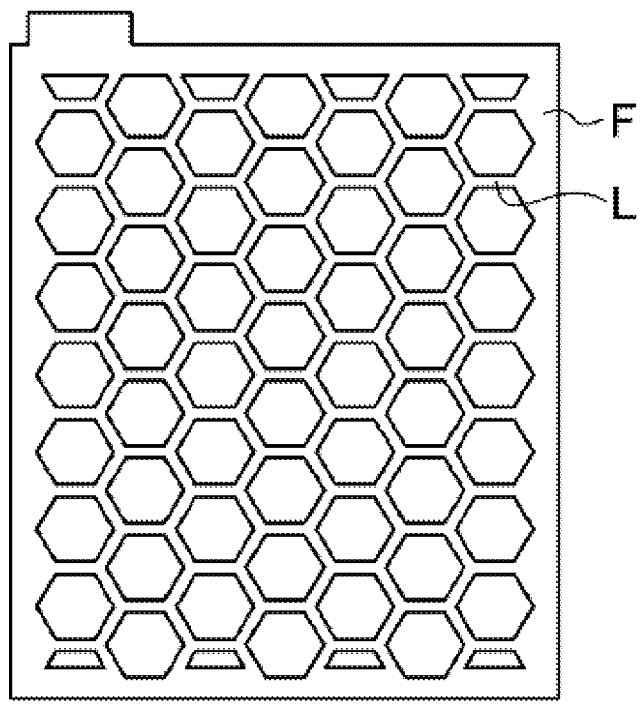
Figure 4:
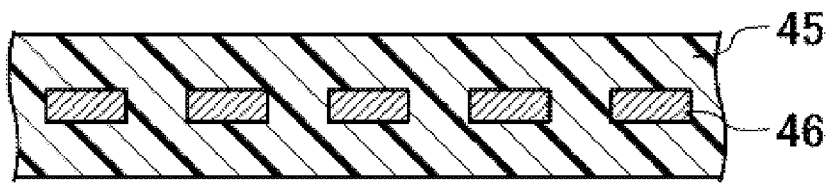
FIG. 4 is a cross-sectional view of an adhesive layer for the liquid crystal display device according to Embodiment 1.
Figure 4:
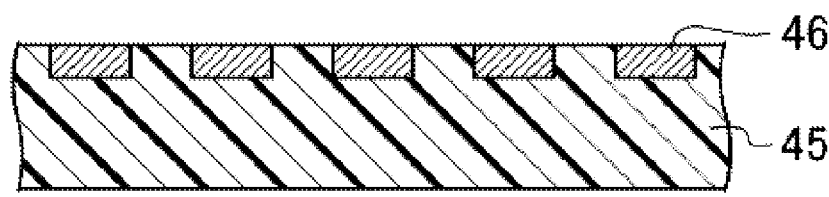
Figure 5:
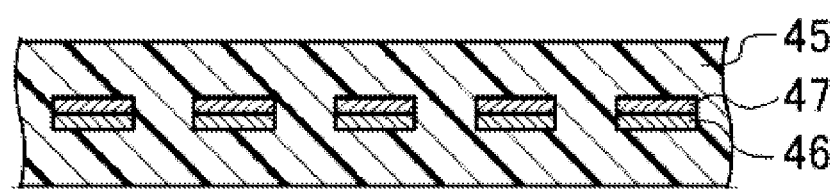
FIG. 5 is a cross-sectional view of another adhesive layer for the liquid crystal display device according to Embodiment 1.
Figure 5:
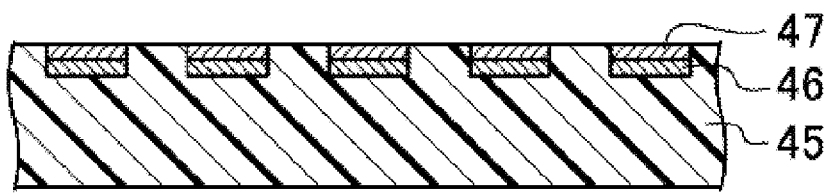

FIGS. 1 to 5 show a display device of Embodiment 1 according to the present invention. Specifically, FIG. 1 is an exploded perspective view of a liquid crystal display device 50a of the present embodiment. FIG. 2 is a side view of the liquid crystal display device 50a. FIG. 3(a) is a plan view of a shield pattern 46a for the liquid crystal display device 50a. FIG. 3(b) is a plan view of a shield pattern 46b that is a modification example of the shield pattern 46a. FIG. 4(a) is a cross-sectional view of an adhesive layer 45 provided with a shield pattern 46. FIG. 4(b) is a cross-sectional view of the adhesive layer 45 that is a modification example of the adhesive layer 45 shown in FIG. 4(a). FIG. 5(a) is a cross-sectional view of the adhesive layer 45 provided with the shield pattern 46 having a surface that is colored black. FIG. 5(b) is a cross-sectional view of the adhesive layer 45 that is a modification example of the adhesive layer 45 shown in FIG. 5(a).

As shown in FIGS. 1 and 2, the liquid crystal display device 50a is provided with a liquid crystal display panel 30 that is used as a display panel for displaying an image, a touch panel 40 of electrostatic capacitance coupling type that is disposed so as to face the liquid crystal display panel 30, the adhesive layer 45 that is disposed between the liquid crystal display panel 30 and the touch panel 40 and that bonds both panels to each other, a polarizing plate 32 that is disposed on a rear surface of the liquid crystal display panel 30 as shown in the figures, and a polarizing plate 44 that is disposed on a top surface of the touch panel 40 as shown in the figures.

As shown in FIGS. 1 and 2, the liquid crystal display panel 30 is provided with a TFT substrate 10 having thin-film transistors (hereinafter also referred to as "TFTs"), pixel electrodes, and the like formed thereon, a CF substrate 20 disposed to face the TFT substrate 10 and having a color filter (hereinafter also referred to as "CF"), a common electrode, and the like formed thereon, a liquid crystal layer (not shown) that is disposed between the TFT substrate 10 and the CF substrate 20, and a sealing member 15 that bonds the TFT substrate 10 and the CF substrate 20 to each other and that is formed in a frame shape to seal the liquid crystal layer between the TFT substrate 10 and the CF substrate 20, for example. As shown in FIGS. 1 and 2, to a terminal region of the TFT substrate 10 protruding from the CF substrate 20, an FPC (flexible printed circuit) 31 for the liquid crystal display panel is attached through an ACF (Anisotropic Conductive Film; not shown).

The liquid crystal display panel 30 having the above configuration displays an image as follows. Prescribed voltages are applied to respective pixels, each of which is the smallest unit of an image, to change the orientation state of the liquid crystal layer, which is disposed between the respective pixel electrodes on the TFT substrate 10 and the common electrode on the CF substrate 20. This makes the transmittance of light that transmits through the panel adjusted in the respective pixels. Consequently, the image is displayed through the touch panel 40.

As shown in FIGS. 1 and 2, the touch panel 40 is provided with a transparent substrate 41 that is a glass substrate or the like, a transparent electrode 42 in a rectangular shape that is disposed on the transparent substrate 41 and that is made of a transparent conductive film or the like such as an ITO film, a frame wiring line (not shown) that is disposed along a circumference of the transparent electrode 42 in a frame shape and that is connected to the transparent electrode 42, and four lead-out wiring lines (not shown) that are respectively led out from four corners of the frame wiring line, for example. As shown in FIGS. 1 and 2, an FPC 43 for the touch panel connected to the transparent electrode 42 is attached to the touch panel 40 through the ACF (not shown).

The touch panel 40 having the above configuration detects a touch position as follows: when the surface of the transparent electrode 42 is touched through the polarizing plate 44, the transparent electrode 42 is grounded through a human body at the touch position; this brings about a change in an electrostatic capacitance formed between respective corners of the transparent electrode 42 and the touch position; and based on the amount of a current that flows through the respective lead-out wiring lines connected to the transparent electrode 42 at that moment, the touch position is detected by an external position detection circuit connected through the FPC 43 for the touch panel, for example.

As shown in FIGS. 1, 2, and 4(a), inside the adhesive layer 45, a shield pattern 46a that is configured to prevent electrical noise generated in the liquid crystal display panel 30 from affecting the touch panel 40 is formed. As shown in FIGS. 1 and 2, the shield pattern 46a is led out to the outside to be grounded or to be connected to a shield circuit that is supplied with a prescribed potential. Here, the shield pattern 46 in FIG. 4(a) encompasses various types of shield patterns such as the shield pattern 46a (see FIG. 3(a)) and the shield pattern 46b (see FIG. 3(b)), which will be described later.

As shown in FIGS. 1 and 3(a), the shield pattern 46a has a frame-shaped pattern portion F that is disposed along a circumference of the adhesive layer 45 in a frame shape and a fine pattern portion L that is disposed inside of the frame-shaped pattern portion F in a rectangular grid pattern. The line width of the fine pattern portion L is about 4 µm to 12 µm, and the line thickness thereof is about 3 µm to 25 µm, for example.

As shown in FIG. 3(b), the shield pattern 46b has a frame-shaped pattern portion F that is disposed in a frame shape and a fine pattern portion L that is disposed inside of the frame-shaped pattern portion F in a hexagonal grid pattern (a honeycomb pattern).

The adhesive layer 45 having the shield pattern 46 formed therein (see FIG. 4(a)) can be formed with a total thickness of about 50 µm to 250 µm as follows. A shield pattern made of a metal wire having a prescribed shape is formed on a substrate using metal with a low electric resistance such as gold, silver, copper, nickel, cobalt, and platinum, utilizing an electroless plating technique, for example. Thereafter, this shield pattern is removed from the substrate and sandwiched between a pair of adhesive films such as acrylic films, polyether films, silicon films, or urethane films.

As shown in FIG. 4(b), the shield pattern 46 may be disposed in a surface of the adhesive layer 45. The adhesive layer 45 having the shield pattern 46 formed in the surface thereof can be formed by embedding the shield pattern, which is removed from the substrate described above, in the surface of a single adhesive film, for example. The adhesive layer 45 having the shield pattern 46 formed in the surface thereof can also be formed by forming the shield pattern on the rear surface of the touch panel 40 by sputtering, photolithography, etching, or the like, and by thereafter coating the surface with an adhesive agent, for example. The adhesive layer 45 having the shield pattern 46 formed thereon may be the surface facing the touch panel 40 or the surface facing the liquid crystal display panel 30.

As shown in FIGS. 5(a) and 5(b), a black layer 47 may be formed on the surface of the shield pattern 46 that faces the touch panel 40 using a nickel sulfate-based plating solution, for example.

In the present embodiment, the respective shield patterns having a rectangular grid pattern and a hexagonal grid pattern are described as examples of the shield pattern 46, but the shield pattern may have any other pattern such as a triangular grid pattern or a pattern formed of a plurality of lines that extend in parallel with each other, for example, and specifically, it is preferable that the shield pattern be formed across the entire surface.

As described above, according to the liquid crystal display device 50a of the present embodiment, the shield pattern 46 (46a or 46b) is provided in the adhesive layer 45 that bonds the liquid crystal display panel 30 for displaying an image and the touch panel 40 of electrostatic capacitance coupling type to each other. Therefore, the adhesive layer 45, which is necessary for bonding the liquid crystal display panel 30 and the touch panel 40 to each other, can also function as a shield member for reducing electrical noise. This makes it possible to prevent a decrease in the position detection accuracy of the touch panel 40, which is caused by electrical noise generated in the liquid crystal display panel 30, and to prevent an increase in the thickness of the device. Therefore, in the liquid crystal display device 50a provided with the liquid crystal display panel 30 and the touch panel 40, it becomes possible to prevent a decrease in the position detection accuracy of the touch panel 40 without increasing the device thickness.

According to the liquid crystal display device 50a of the present embodiment, the shield pattern 46 is provided with the frame-shaped pattern portion F that is disposed in a frame shape and the fine pattern portion L that is disposed inside of the frame-shaped pattern portion F in a grid pattern. Therefore, even if a display screen of the liquid crystal display device 50a is made larger, a potential of the transparent electrode 42 disposed in the touch panel 40 becomes more likely to be kept uniform throughout the screen. Consequently, it becomes possible to achieve a larger screen in the liquid crystal display device 50a having a touch panel function.

According to the liquid crystal display device 50a of the present embodiment, the line width of the fine pattern portion L that is disposed inside of the frame-shaped pattern portion F in a grid pattern is 12 µm or less. Therefore, it becomes possible to make the fine pattern portion L less visible.

According to the liquid crystal display device 50a of the present embodiment, because the shield pattern 46 is formed of a metal wire such as copper or silver, for example, the shield pattern 46 has a significantly lower electrical resistance as compared with a transparent conductive film such as an ITO film, which has been conventionally used as a shield member. Therefore, the electrical noise can be reduced by the shield pattern 46 uniformly throughout the entire screen.

According to a modification example of the liquid crystal display device 50a of the present embodiment, because the surface of the shield pattern 46 on the side facing the touch panel 40 is colored black, it becomes possible to suppress a reflection of ambient light entering from the touch panel 40 side. Consequently, a display quality can be improved.

According to the liquid crystal display device 50a of the present embodiment, because the shield pattern 46 is disposed inside of the adhesive layer 45, the entire front and rear surfaces of the adhesive layer 45 retain adhesiveness. This makes it possible to firmly bond the liquid crystal display panel 30 and the touch panel 40 to each other.

According to the modification example of the liquid crystal display device 50a of the present embodiment, the shield pattern 46 is disposed on the surface of the adhesive layer 45. This allows the adhesive layer 45 having the shield pattern 46 to be formed by embedding the shield pattern 46 in the surface of the adhesive layer 45 or by applying an adhesive agent onto the liquid crystal display panel 30 or the touch panel 40 having the shield pattern 46 formed on the surface thereof, for example. As a result, the manufacturing cost can be reduced.

Embodiment 2

Figure 6:
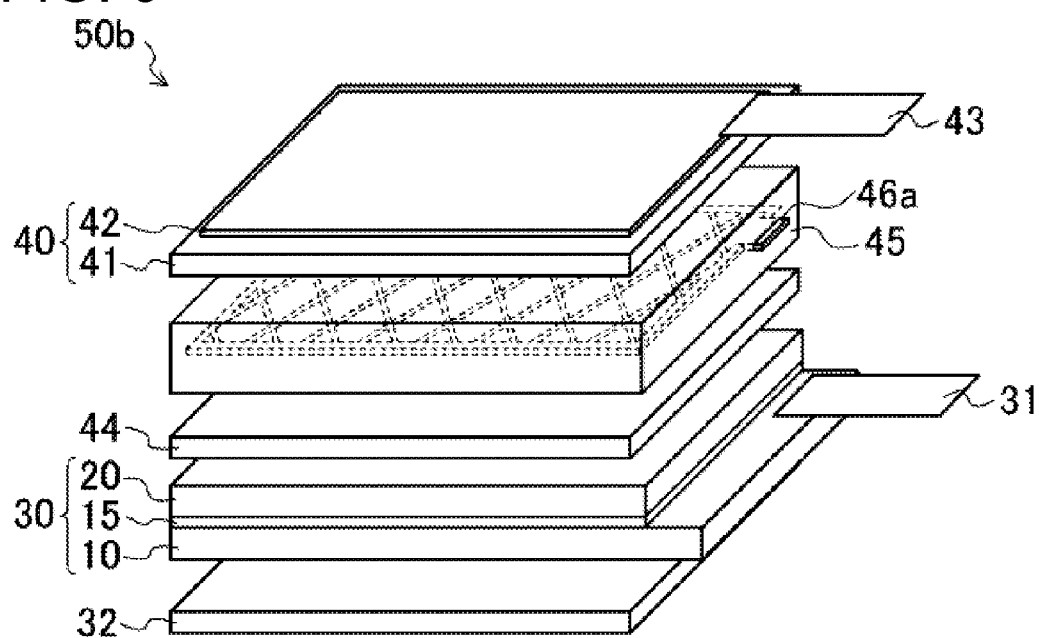
FIG. 6 is an exploded perspective view of a liquid crystal display device according to Embodiment 2.
Figure 7:
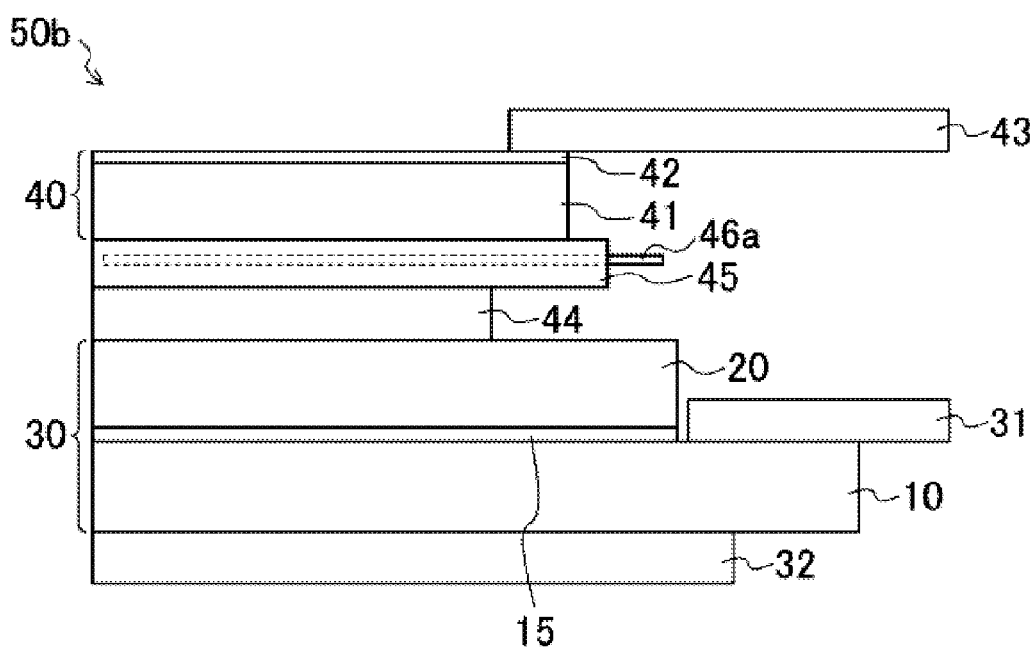
FIG. 7 is a side view of the liquid crystal display device according to Embodiment 2.

FIG. 6 is an exploded perspective view of a liquid crystal display device 50b of the present embodiment. FIG. 7 is a side view of the liquid crystal display device 50b. In the respective embodiments below, the same components as those in FIGS. 1 to 5 will be given the same reference characters, and detailed descriptions thereof will not be repeated.

In Embodiment 1, the liquid crystal display device 50a in which the polarizing plate 44, which is the polarizing plate facing the user of the touch panel 40, is placed on the top surface of the touch panel 40 was described as an example, but the present embodiment will describe the liquid crystal display device 50b having the polarizing plate 44 formed on the top surface of the liquid crystal display panel 30 as an example.

Specifically, as shown in FIGS. 6 and 7, the liquid crystal display device 50b is provided with the liquid crystal display panel 30 having the polarizing plates 44 and 32 respectively formed on the front and rear surfaces thereof in the figures, the touch panel 40 of electrostatic capacitance coupling type that is disposed so as to face the liquid crystal display panel 30, and the adhesive layer 45 that is disposed between the liquid crystal display panel 30 and the touch panel 40 and that bonds both panels to each other having the polarizing plate 44 interposed therebetween.

According to the liquid crystal display device 50b of the present embodiment, in a manner similar to Embodiment 1, the shield pattern 46a is provided in the adhesive layer 45 that bonds the liquid crystal display panel 30 to the touch panel 40 having the polarizing plate 44 interposed therebetween. Therefore, in the liquid crystal display device 50b provided with the liquid crystal display panel 30 and the touch panel 40, it becomes possible to prevent a decrease in the position detection accuracy of on the touch panel 40 without increasing the device thickness.

Embodiment 3

Figure 8:
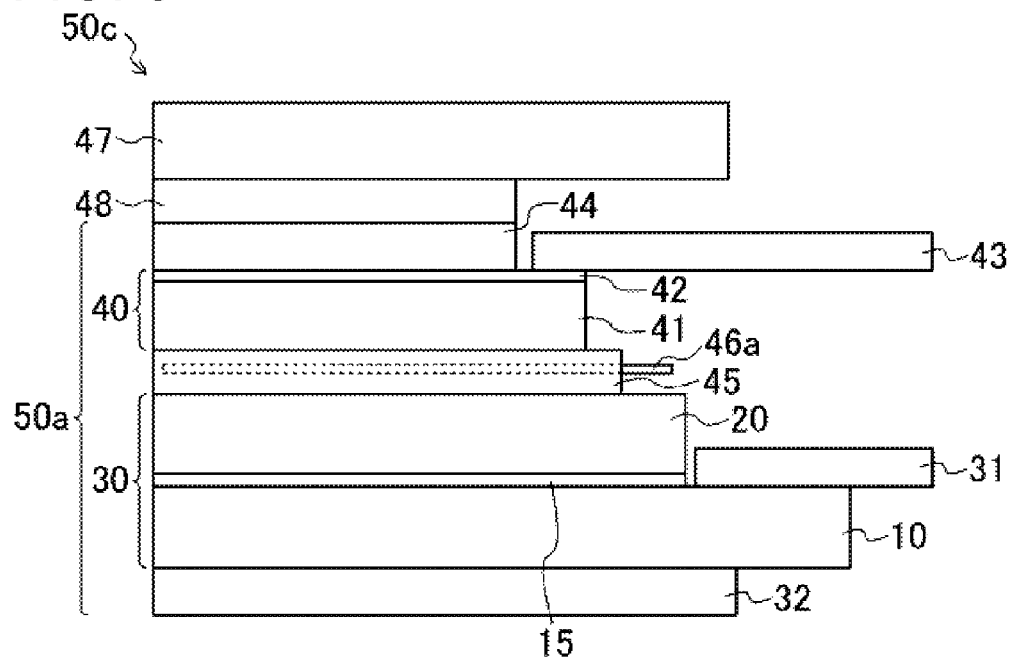
FIG. 8 is a side view of a liquid crystal display device according to Embodiment 3.
Figure 9:
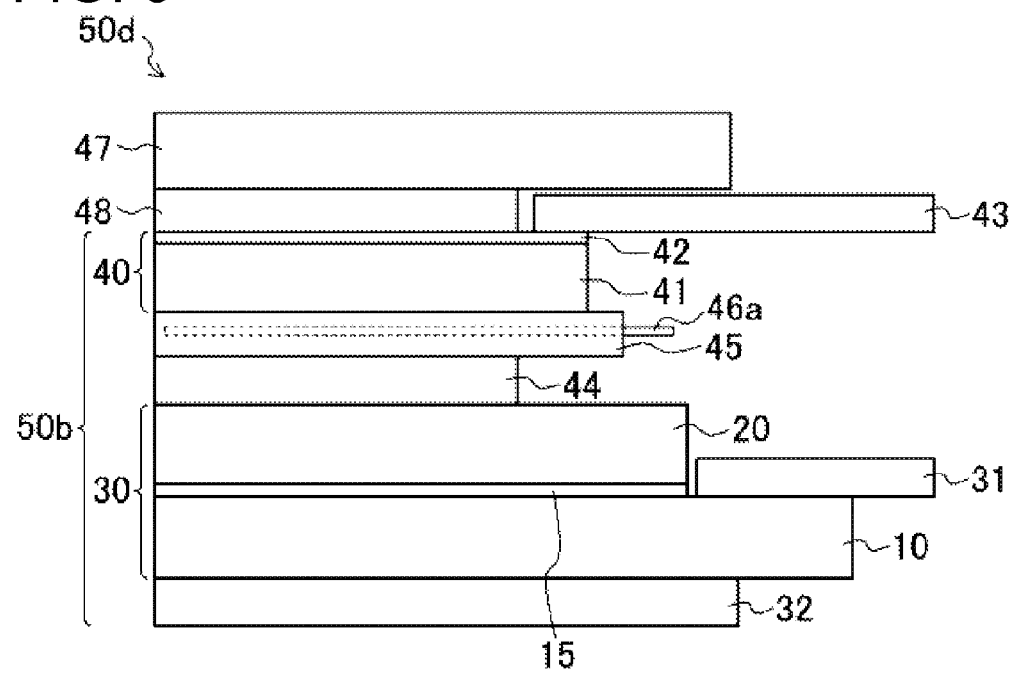
FIG. 9 is a side view of another liquid crystal display device according to Embodiment 3.

FIG. 8 is a side view of a liquid crystal display device 50c of the present embodiment. FIG. 9 is a side view of a liquid crystal display device 50d of the present embodiment.

In the respective embodiments described above, the liquid crystal display devices 50a and 50b that do not have a cover above the top surface of the touch panel 40 are described as examples, but in the present embodiment, liquid crystal display devices 50c and 50d respectively having a cover 47 above the top surface of the touch panel 40 will be described as examples.

Specifically, as shown in FIG. 8, the liquid crystal display device 50c has a configuration in which the liquid crystal display device 50a described in Embodiment 1 above is provided with the cover 47 on the top surface thereof through an adhesive layer 48. The cover 47 is a glass substrate or a plastic substrate for protecting the touch panel 40, and decorative patterns and the like are printed on a surface thereof. The adhesive layer 48 is constituted of an adhesive agent such as an acrylic agent, a polyether agent, a silicon agent, and a urethane agent, in the same manner as the adhesive layer 45 described above.

As shown in FIG. 9, the liquid crystal display device 50d has a configuration in which the liquid crystal display device 50b described in Embodiment 2 above is provided with the cover 47 on the top surface thereof through the adhesive layer 48.

According to the liquid crystal display device 50c (50d) of these embodiments, the shield pattern 46a is provided in the adhesive layer 45 that bonds the liquid crystal display panel 30 and the touch panel 40 (having the polarizing plate 44 interposed therebetween) in a manner similar to the respective embodiments described above. Therefore, in the liquid crystal display device 50c (50d) provided with the liquid crystal display panel 30 and the touch panel 40, it becomes possible to prevent a decrease in the position detection accuracy of the touch panel 40 without increasing the device thickness. Further, because the cover 47, the touch panel 40, and the liquid crystal display panel 30 are placed without having an air layer interposed therebetween, the display device is less likely to be affected by an interface reflection due to ambient light. Therefore, it becomes possible to improve a display quality.

In the respective embodiments described above, the liquid crystal display device is described as an example of the display device. The present invention can also be applied to other display devices such as an organic EL (electro luminescence) display device, for example.

In the respective embodiments described above, the display device provided with the touch panel of electrostatic capacitance coupling type is described as an example. The present invention can also be applied to a display device provided with a touch panel of other types that is susceptible to electromagnetic waves generated in the display panel, for example.

INDUSTRIAL APPLICABILITY

As described above, the present invention can prevent a decrease in the position detection accuracy of a touch panel without increasing the device thickness. Therefore, the present invention is useful for a display device for a mobile device.

DESCRIPTION OF REFERENCE CHARACTERS

F frame-shaped pattern portion
L fine pattern portion
30 liquid crystal display panel
40 touch panel
45 adhesive layer
46, 46a, 46b shield pattern
50a to 50d liquid crystal display device

The invention claimed is:
1. A display device, comprising:
a display panel that displays an image;
a touch panel of electrostatic capacitance coupling type disposed so as to face the display panel; and
an adhesive layer disposed between the display panel and the touch panel to bond said display panel and said touch panel to each other,
wherein the adhesive layer has a shield pattern that is configured to prevent electrical noise generated in the display panel from affecting the touch panel, and
wherein the shield pattern has a frame-shaped pattern portion disposed along a circumference of the adhesive layer in a frame shape, and a fine pattern portion disposed inside of said frame-shaped pattern portion in a grid pattern.

2. The display device according to claim 1, wherein the fine pattern portion is formed with a line width of 12 μm or less.

3. The display device according to claim 1, wherein the shield pattern is formed of a metal wire.

4. The display device according to claim 3, wherein a surface of the shield pattern on a side facing the touch panel is colored black.

5. The display device according to claim 1, wherein the shield pattern is disposed inside of the adhesive layer.

6. The display device according to claim 1, wherein the shield pattern is disposed in a surface of the adhesive layer.

* * * * *